(No Model.)
C. T. GUY.
DISH CLEANER.
No. 553,612. Patented Jan. 28, 1896.
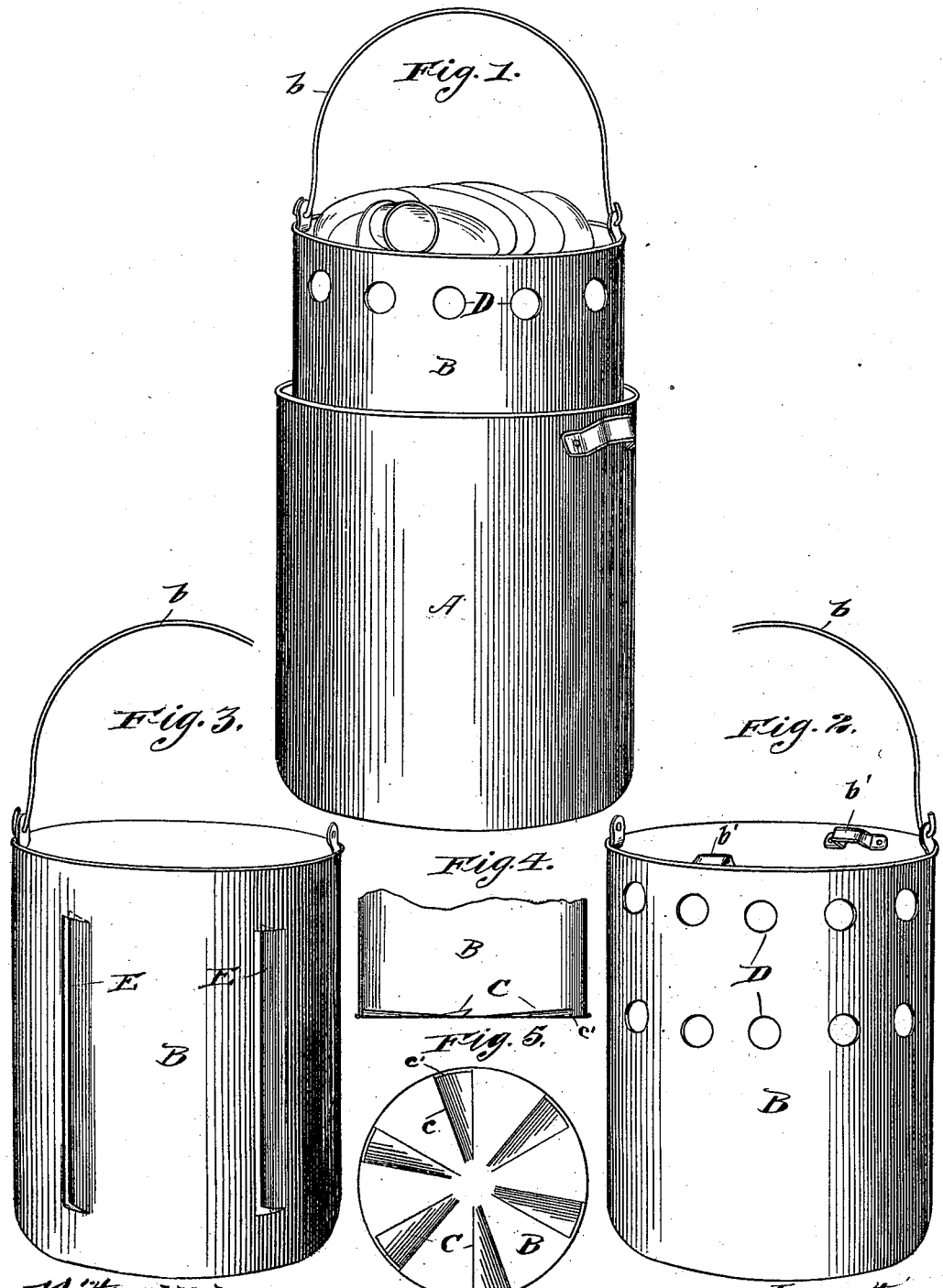
Witnesses.
Inventor.

UNITED STATES PATENT OFFICE.

CLEMENT T. GUY, OF MOLINE, ILLINOIS.

DISH-CLEANER.

SPECIFICATION forming part of Letters Patent No. 553,612, dated January 28, 1896.

Application filed June 5, 1894. Serial No. 513,576. (No model.)

*To all whom it may concern:*

Be it known that I, CLEMENT T. GUY, of Moline, Illinois, have invented certain new and useful Improvements in Dish-Cleaners, of which the following is a specification.

My invention relates to that class of dish-cleaners in which two vessels are arranged concentrically to each other, the inner one being used to hold the dishes and the outer one to contain a body of water. In my construction the inner vessel is provided with apertures in its side wall and with elongated radial openings in its bottom wall, adjacent to which are deflecting-wings, which control the course of the currents of water entering the inner vessel through the bottom of the inner vessel when the latter is moved down and up in cleansing the dishes.

In the accompanying drawings, Figure 1 is a perspective view showing the vessels, the inner one containing dishes and slightly raised in order to show a series of circular apertures in its side wall. Fig. 2 is a similar view of the inner vessel alone, showing two series of perforations. Fig. 3 is a like view showing another form of openings in the side wall. Fig. 4 is a broken sectional detail of the lower portion of the inner vessel, showing the openings in the bottom, and Fig. 5 is a plan view of the same.

In the drawings, let A represent the outer vessel, which is intended to serve as a reservoir to contain water by which the cleansing is effected, and which is preferably cylindrical in form.

B represents the inner vessel of a somewhat less diameter than the outer vessel, so as to provide for a body of water between the two. Said inner vessel will be of a shape in cross-section corresponding to, or approximately corresponding to, that of the outer vessel, and is preferably provided with the bail *b* or handles *b'*. The bottom wall of this vessel is provided with a series of openings, and I prefer to provide these openings by slitting the metal of the bottom radially and then incising the metal in the arc of a circle, so as to provide for turning down or up a lip C, which will be free at one margin *c* and at its outer end *c'*. These lips or radial wings are, when turned either up or down, slightly inclined and stand at an angle to the plane of the bottom of the vessel, and they will operate to direct the water contained in the outer vessel into the inner vessel when the inner vessel is moved up and down. By moving the inner vessel up and down a series of streams of water will be forced to enter through the radial openings of the bottom, and thus strong currents of water may be generated and forced through the dishes within the inner vessel. These streams enter the inner vessel tangentially and are directed by the curved sides in circular or spiral courses, thus moving circumferentially about the inner vessel and cleansing the dishes much more rapidly and thoroughly than in previous constructions.

A further improvement consists in providing the inner vessel with a series of openings or apertures of any desired form in the sides thereof, by means of which water may be admitted in streams at different points along the sides of the inner vessel—as, for example, I may employ one or more rows of apertures D, as shown in Fig. 2, but I prefer to employ a series of apertures formed by incising the side wall of the inner vessel and turning the metal either inwardly or outwardly, preferably the former, to form a series of longitudinal deflectors or lips E. There is also a peculiar action due to the combined effect of the openings in the bottom and side walls of the inner vessel when said bottom openings are of the peculiar form shown, which may be described as follows: When the inner vessel is moved up and down like a plunger, the water will flow in through the bottom openings in spiral currents, as before described, and the whole body of water both inside and outside of the inner vessel will partake of this whirling or spiral motion. When the inner vessel is lowered until the streams of water enter the side apertures, it is found in practice that these streams have also a tangential direction, but in a direction opposite to that in which the streams enter through the bottom openings. The effect of these cross-currents of water is greater than if the streams of water simply entered through circular apertures in the bottom and through like apertures in the side walls, and so in all cases I prefer to employ the peculiar construction of openings in the bottom wall which I have described.

What I claim as new, and desire to secure by Letters Patent, is—

1. A dish cleaner, comprising in combination an outer and an inner vessel concentrically arranged, the inner vessel being free to be moved up and down and provided with apertures in its side walls and with radial openings in its bottom wall and with lips adjacent to said apertures in planes angular to the bottom, substantially as and for the purpose set forth.

2. A dish cleaner, comprising in combination an outer and an inner vessel concentrically arranged, the inner vessel being free to be moved up and down and provided with apertures in its side walls and with radial openings in its bottom wall, the material thereof being turned out to provide angular lips adjacent to the radial openings, substantially as described.

CLEMENT T. GUY.

Witnesses;
FREDERICK C. GOODWIN,
N. M. BOND.